US007762724B2

(12) United States Patent
Yoshimura et al.

(10) Patent No.: US 7,762,724 B2

(45) Date of Patent: Jul. 27, 2010

(54) COMPRESSOR BEARING

(75) Inventors: Shoji Yoshimura, Takasago (JP); Yasushi Amano, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 468 days.

(21) Appl. No.: 11/773,732

(22) Filed: Jul. 5, 2007

(65) Prior Publication Data

US 2008/0056632 A1 Mar. 6, 2008

(30) Foreign Application Priority Data

Aug. 29, 2006 (JP) ............................ 2006-232158

(51) Int. Cl.
*F16C 33/66* (2006.01)
*F16C 33/10* (2006.01)

(52) U.S. Cl. ....................... 384/400; 384/291; 384/385; 384/397

(58) Field of Classification Search ................. 384/118, 384/123, 286, 291, 311, 316, 392, 397–398, 384/400, 385

See application file for complete search history.

(56) References Cited

U.S. PATENT DOCUMENTS 2,578,712 A * 12/1951 Martellotti .................. 384/118
2,697,017 A * 12/1954 Evans ......................... 384/291
3,058,787 A * 10/1962 Bernson ..................... 384/287
3,975,123 A * 8/1976 Schibbye ..................... 418/97
4,639,148 A * 1/1987 Tamura et al. .............. 384/420
5,246,352 A * 9/1993 Kawakami ................... 384/99
5,480,234 A * 1/1996 Chen et al. .................. 384/313
5,554,015 A * 9/1996 Dreiman et al. ............. 384/368
5,769,545 A * 6/1998 Bently et al. .................. 384/99
5,947,709 A * 9/1999 Koyama et al. ............ 418/55.6
6,053,636 A * 4/2000 Pelfrey et al. ............... 384/114
6,142,672 A * 11/2000 Bently et al. ................ 384/118
6,966,700 B2 * 11/2005 Weissbacher ............... 384/316
7,140,779 B2 * 11/2006 Yoshimura et al. .......... 384/306
7,204,671 B2 * 4/2007 Dellmann ................... 415/111

FOREIGN PATENT DOCUMENTS

GB 2 062 127 A 5/1981
JP 2005-69186 3/2005
SU 1521915 A1 12/1987

* cited by examiner

*Primary Examiner*—Marcus Charles
(74) *Attorney, Agent, or Firm*—Oblon, Spivak, McClelland, Maier & Neustadt, L.L.P.

(57) ABSTRACT

In a compressor bearing for supporting a rotor shaft of a compressor, a first oil groove is formed in a bearing surface on the side opposite to a bearing load acting direction, a second oil groove is formed in a position adjacent to the first oil groove in an anti-rotational direction, a first oil channel and a second oil channel communicating with the first oil groove and the second oil groove, respectively, to supply oil to the first and second oil grooves from an exterior, common oil supply source are provided, a circumferential length of the second oil groove is set larger than that of the first oil groove, and a minimum value of a sectional area perpendicular to the longitudinal direction of the second oil channel is set smaller than that of a sectional area perpendicular to the longitudinal direction of the first oil channel. The compressor bearing of such a configuration is small in load induced by oil pressure and exhibits an outstanding rotor shaft cooling effect.

7 Claims, 7 Drawing Sheets

COMPRESSOR BEARING

BACKGROUND OF THE INVENTION

1. Field of the Invention

The present invention relates to a compressor bearing, e.g., a bearing for a screw compressor.

2. Description of the Prior Art

Heretofore, as a radial plain bearing for supporting a rotor shaft of a screw compressor, as is disclosed in Japanese Patent Laid-Open Publication No. 2005-69186, there has been used a dynamic pressure plain bearing having a fixed sliding surface, especially a cylindrical full journal bearing, because a high load is imposed on the bearing in a certain constant direction during operation of the compressor. In the full journal bearing, as shown in FIG. 8, in order to supply oil to a bearing surface 22 which supports a rotor shaft 21, an oil groove 23 is formed on the side opposite to the direction of a bearing load P and oil is supplied from the exterior to the oil groove 23 through an oil supply hole 24. Since the oil groove 23 is used also for cooling the rotor shaft 21, a circumferential length A of the oil groove 23 is set at a wide angle of about 120°.

In an oil-cooled screw compressor, the oil supply pressure is equal to the discharge pressure of the compressor, so that the internal pressure of the oil groove is also approximately equal to the discharge pressure. On the other hand, an ambient pressure of a bearing is approximately equal to the suction pressure of the compressor. Therefore, both a load $P_1$ induced by normally acting compressed gas and a load $P_2$ induced by the oil pressure in the oil groove act on a rotor shaft. In the case of a high pressure compressor, the oil supply pressure also becomes high and hence a load $P_2$ of for example about 1.5 times as much as the load $P_1$ acts on the rotor shaft. Consequently, there has been a case where the bearing cannot withstand and is damaged.

If the angle of the oil groove 23 is set small, the area of oil pressure acting on the rotor shaft 21 becomes smaller and it is possible to diminish the load $P_2$, but there has been the problem that the rotor shaft 21 cannot be cooled and undergoes a thermal expansion, with consequent loss of a gap and damage of the bearing.

SUMMARY OF THE INVENTION

It is an object of the present invention to provide a compressor bearing with reduced load induced by oil pressure and exhibiting an outstanding rotor shaft cooling effect.

According to the present invention, for solving the above-mentioned problems, there is provided a compressor bearing for supporting a rotor shaft of a compressor wherein a first oil groove is formed in a bearing surface on the side opposite to a bearing load acting direction and a second oil groove is formed in the bearing surface at a position adjacent to the first oil groove in an anti-rotational direction, a circumferential length of the second oil groove being larger than that of the first oil groove, wherein the bearing comprises a first oil channel communicating with the first oil groove to supply oil to the first oil groove from the exterior, a second oil channel communicating with the second oil groove to supply oil to the second oil groove from the exterior, and a common oil supply source disposed outside the bearing to supply oil to both the first oil channel and the second oil channel, and wherein a minimum value of a sectional area perpendicular to the longitudinal direction of the second oil channel is smaller than that of a sectional area perpendicular to the longitudinal direction of the first oil channel.

According to this configuration, the oil supplied to the first oil groove gets into a gap formed between the bearing and the rotor shaft to lubricate the rotor shaft, but since the circumferential length of the first oil groove is small and the area of oil pressure acting on the rotor shaft is small, the load induced by the oil pressure supplied to the first oil groove becomes small and hence it is possible to prevent damage of the bearing.

The oil supplied to the second oil groove cools the rotor shaft. Since the circumferential length of the second oil groove is larger than that of the first oil groove and the area of cooling is large, the rotor shaft cooling effect becomes more outstanding and it is possible to prevent damage of the bearing caused by decrease of the gap which results from thermal expansion of the rotor shaft.

Moreover, since the oil pressure in the second oil groove can be made lower than that in the first oil groove, it is possible to prevent an excessive load from being imposed on the rotor shaft.

In connection with the compressor bearing of the present invention, as the configuration wherein the minimum value of a sectional area perpendicular to the longitudinal direction of the second oil channel is set smaller than that of a sectional are perpendicular to the longitudinal direction of the first oil channel, there may be adopted any of the following configurations.

The area of opening of an oil supply hole in a boundary position between the second oil channel and the second oil groove is set smaller than that of an oil supply hole in a boundary position between the first oil channel and the first oil groove.

The sectional area perpendicular to the longitudinal direction of the second oil channel is constant and that perpendicular to the longitudinal direction of the first oil channel is constant, and the former is the smaller.

Throttle means is provided in the second oil channel and the sectional area perpendicular to the longitudinal direction of the second oil channel is the smallest at the position of the throttle means.

Preferably, in the compressor bearing of the present invention, a relief groove extending from the second oil groove to a bearing end face is formed in the bearing surface.

Preferably, a third oil groove is formed in the bearing surface on the side opposite to the bearing load acting direction and in adjacency to the second oil groove in the anti-rotational direction and a relief groove extending from the third oil groove to a bearing end face is formed in the bearing surface.

In this case, it is preferable that a third oil channel communicating with the third oil groove to supply oil to the third oil groove from the exterior be provided and that oil be supplied to the third oil channel from the common oil supply source.

DETAILED DESCRIPTION OF PREFERRED EMBODIMENTS

Embodiments of the present invention will be described hereinunder with reference to the drawings.

Figure 1:
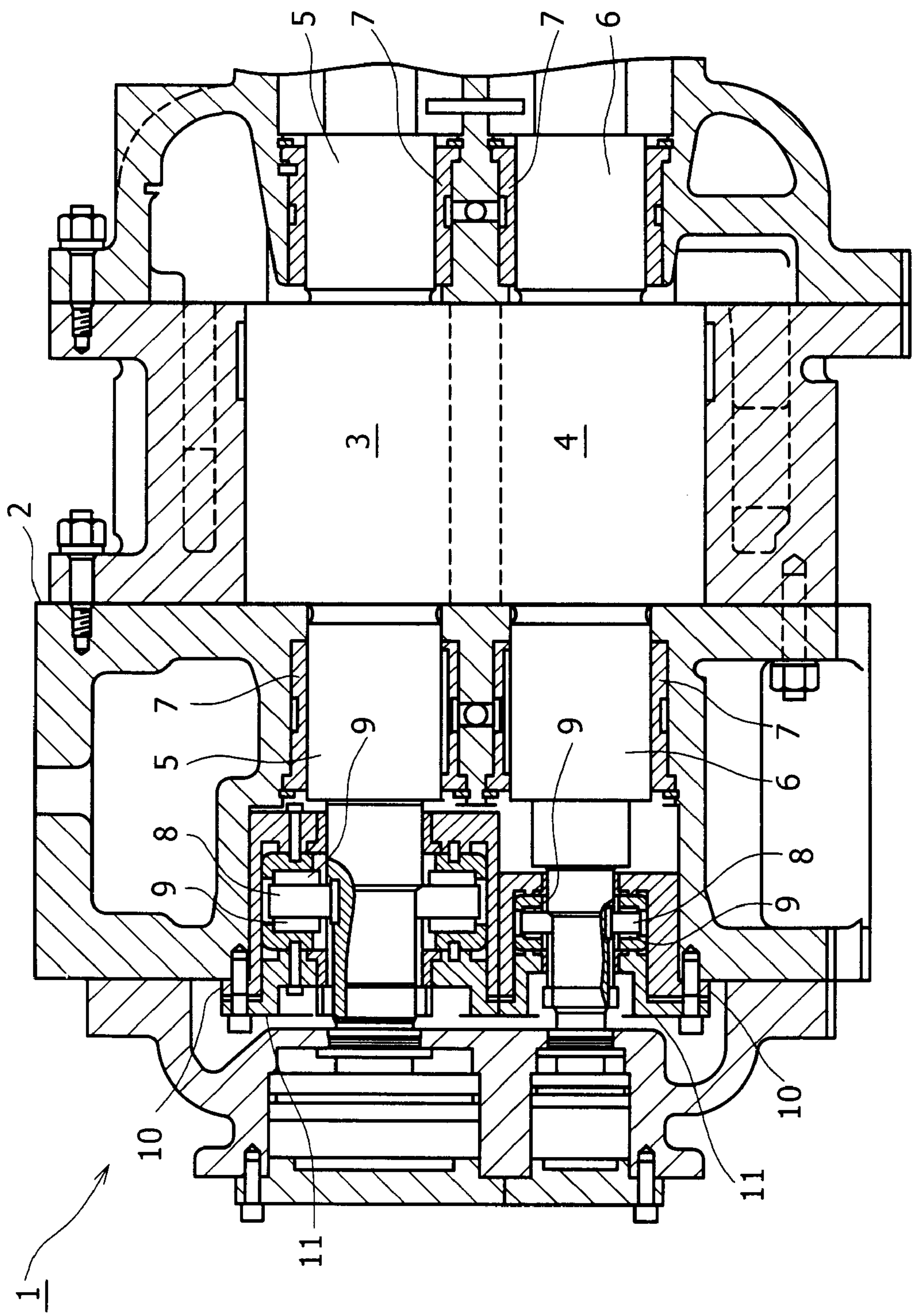
FIG. 1 is a sectional view of an oil-cooled screw compressor using a bearing according to an embodiment of the present invention.

FIG. 1 shows an oil-cooled screw compressor 1 using a bearing embodying the present invention. A pair of intermeshing male and female screw rotors 3, 4 is accommodated within a casing 2 of the oil-cooled screw compressor 1. Rotor shafts 5 and 6 at both ends of the screw rotors 3 and 4 respectively are supported by radial bearings 7 embodying the present invention which bearings will be described later. Outside the left-hand radial bearings 7 in FIG. 1 there are disposed thrust bearings 9 through bearing caps 10 and 11. The thrust bearings 9 support disc-like thrust members 8 from both sides. The thrust members 8 are fitted on the rotor shafts 5 and 6. The right-hand rotor shaft 5 in FIG. 1 of one screw rotor 3 is driven for rotation by a motor (not shown) and the other screw rotor 4 rotates along with rotation of the screw rotor 3.

Figure 2:
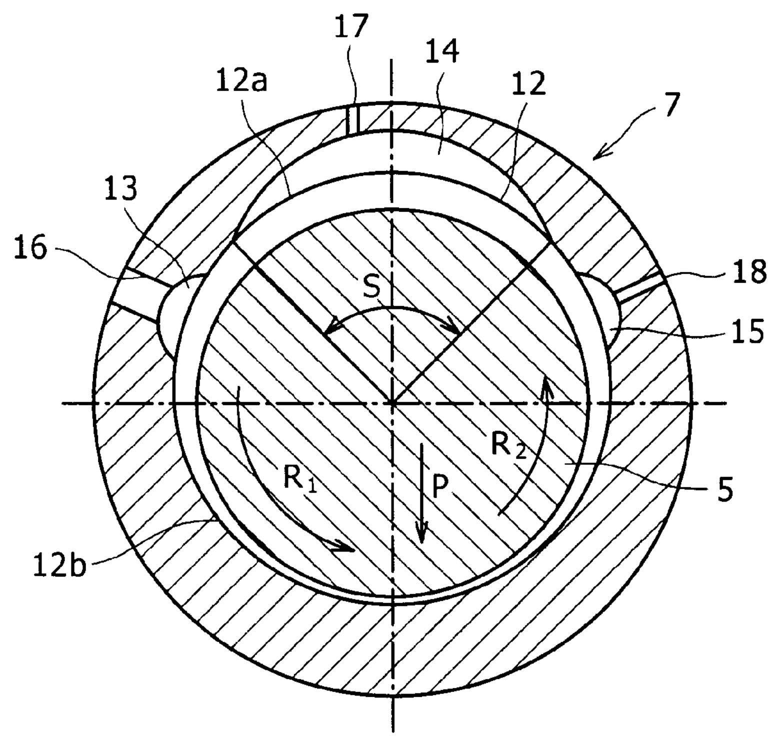
FIG. 2 is a sectional view thereof.
Figure 3:
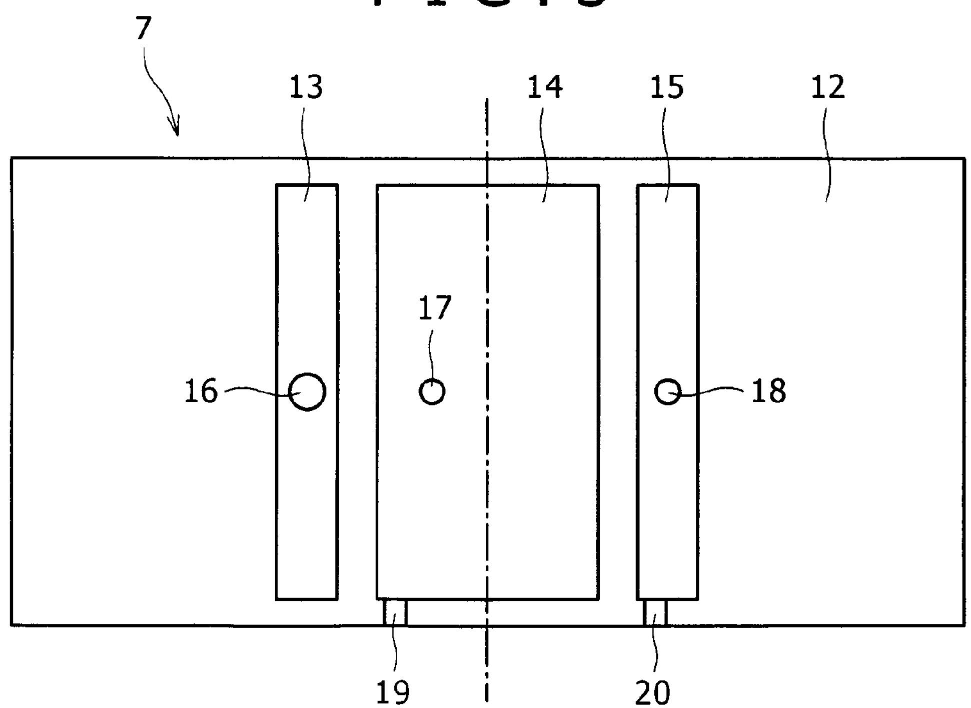
FIG. 3 is a developed view of a bearing surface of the bearing.

FIG. 2 is an enlarged sectional view of the left-hand radial bearing 7 in FIG. 1 of the screw rotor 3. The other radial bearings 7 are also of the same configuration as the configuration shown in FIG. 2 and therefore explanations thereof will be omitted. An inner bearing surface 12 on which the rotor shaft 5 of the radial bearing 7 slides includes a bearing surface 12*a* on the side opposite to a working direction of a bearing load P, and a first oil groove 13, a second oil groove 14 and a third oil groove 15 are formed in the bearing surface 12*a*. The bearing surface 12*a* on the side opposite to the working direction of the bearing load P indicates a bearing surface in the range of about 180° on the side opposite to the direction of a resultant force of both a load induced by compressed gas acting during operation of the screw compressor 1 and the own weights of the screw rotors 3, 4 and the rotor shafts 5, 6. As an example, in FIG. 2, the working direction of the bearing load P is shown as a downward direction. The first oil groove 13 is positioned on a most downstream side in the rotational direction of the rotor shaft 5. The second oil groove 14 is positioned upstream of the first oil groove 13 and the third oil groove 15 is positioned upstream of the second oil groove 14. In other words, the second oil groove 14 is adjacent to the first oil groove 13 in the anti-rotational direction and the third oil groove 15 is adjacent to the second oil groove 14 in the anti-rotational direction. A first oil supply hole 16, a second oil supply hole 17, and a third oil supply hole 18, which are in communication with an outer periphery surface of the radial bearing 7, are formed in the first oil groove 13, the second oil groove 14, and the third oil groove 15, respectively. Oil is separated and recovered by an oil separating/recovering unit from gas discharged from the screw compressor 1 and is supplied to the first, second and third oil supply holes 16, 17, 18. This is a common oil supply source for the first, second and third oil grooves 13, 14, 15.

The first oil groove 13 functions to supply oil to a bearing surface 12*b* which undergoes the bearing load P of the rotor shaft 5. Therefore, the first oil groove 13 is disposed closer to the bearing surface 12*b* which undergoes the bearing load P than the second oil groove 14. Since the first oil groove 13 supplies oil to between the bearing surface 12*b* which undergoes the bearing load P and the rotor shaft 5, a certain high pressure is needed. The oil in the first oil groove 13 gets into a gap between the bearing surface 12 and the rotor shaft 5, but a portion thereof escapes from a bearing end face to the exterior. If the amount of the escaping oil is large, the oil pressure in the first oil groove 13 drops and it becomes no longer possible to supply oil to the gap between the bearing surface 12 and the rotor shaft 5. For this reason, the first oil supply hole 16 in the first oil groove 13 is formed larger than the oil supply holes 17 and 18 in the other oil grooves 14 and 15. That is, the area of opening of the first oil supply hole 16 on the bearing surface 12 side is larger than that of each of the oil supply holes 17 and 18 on the bearing surface 12 side.

The second oil groove 14 functions to cool the rotor shaft 5 with oil stored in the interior thereof. Accordingly, it is necessary that the area of contact thereof with the rotor shaft 5 be made large and it is preferable that the length S of an inner periphery surface of the rotor shaft 5 be at an angle of 60° to 120°. In the example of FIG. 2, it is formed at an angle of 90°. If a high pressure is developed in the second oil groove 14, an excessive load is imposed on the rotor shaft 5 and hence it is necessary to reduce the pressure.

Generally, in such a bearing, the pressure of oil in an oil groove formed in an inner surface of the bearing is influenced by the pressure of supplied oil, the flow rate thereof, the flow rate of oil escaping from a bearing end face and that of oil escaping from a relief groove. Further, if in the interior of an oil supply channel there is a portion which narrows the channel area and acts like an orifice, the characteristic thereof is also taken into account in determining the pressure of oil in the oil groove formed in the bearing inner surface. In the compressor bearing embodying the present invention, the internal pressure of the second oil groove can be made lower than that of the first oil groove by supplying oil to the first and second oil grooves from a common oil supply source and also by a morphological condition such that a minimum value of a sectional area perpendicular to the longitudinal direction of the oil supply channel to the second oil groove is set smaller than that of a sectional area perpendicular to the longitudinal direction of the oil supply channel to the first oil groove.

In the example of FIG. 2, the internal pressure of the second oil groove 14 is determined by the balance between the amount of oil supplied from the second oil supply hole 17 and the amount of oil escaping from a bearing end face to the exterior. The amount of oil escaping from the bearing end face depends on the gap between the rotor shaft 5 and the bearing surface 12 (FIG. 2 does not show the gap size accurately, but actually the gap size is about one thousandth of the inside diameter of the bearing). If the second oil supply hole 17 formed in the second oil groove 14 is large, the oil pressure becomes high and hence it is necessary that the second oil supply hole 17 be made smaller than the first oil supply hole 16. That is, in the example of FIG. 2, the area of opening of the second oil supply hole 17 in a boundary position between the oil channel to the second oil groove 14 and the second oil groove 14 is made smaller than that of the first oil supply hole 16 in a boundary position between the oil channel to the first oil groove 13 and the first oil groove 13, whereby a minimum value of a sectional area perpendicular to the longitudinal direction of the oil channel to the second oil groove 14 is made smaller than that of a sectional area perpendicular to the longitudinal direction of the oil channel to the first oil groove 13. If the second oil supply hole 17 is small, the amount of flowing oil decreases and the cooling effect for the rotor shaft 5 is deteriorated. In view of this point, as shown in FIG. 2, a relief groove 19 is formed between the second oil groove 14 and a bearing end face. Since the oil supplied to the second oil groove 14 flows out from the relief groove 19, the amount of flowing oil increases and it is thereby possible to enhance the cooling effect for the rotor shaft 5.

The reason why the second oil groove 14 is adjacent to the first oil groove 13 in the anti-rotational direction of the rotor shaft is as follows. For example, if the second oil groove 14 is adjacent to the first oil groove 13 in the rotational direction of the rotor shaft, the oil flowing out from the first oil groove 13 exerts an influence on the rotor shaft portion which undergoes the action of oil from the second oil groove 14. As a result, oil of a higher pressure than in case of the second oil groove 14 being adjacent to the first oil groove 13 in the anti-rotational direction of the rotor shaft is supplied to the rotor shaft portion which undergoes the action of oil from the second oil groove 14. Consequently, an excessive load is imposed on the rotor shaft 5 vertically downward and there may occur an undesirable case where the rotor shaft 5 and the casing slide under the application of a strong load to the lower portion of the rotor shaft 5. To prevent the occurrence of such a case, the second oil groove 14 is adjacent to the first oil groove 13 in the anti-rotational direction of the rotor shaft.

The third oil groove 15 functions to receive high-temperature oil and allows it to escape to the exterior, the high-temperature oil being supplied between the bearing surface 12 and the rotor shaft 5 from the first oil groove 13 and flowing in the directions of arrows $R_1$ and $R_2$. The oil supplied between the bearing surface 12 and the rotor shaft 5 from the first oil groove 14 undergoes a strong shear force and its temperature rises while flowing in the direction of arrow $R_1$. Further, the oil flows in the direction of arrow R2 and tends to flow into the second oil groove 14 of a low pressure. When the high-temperature oil flows into the second oil groove 14, the temperature of the oil in the second oil groove 14 rises, making it difficult to cool the rotor shaft 5. To avoid such an inconvenience, the third oil groove 15 is formed upstream of the second oil groove 14 and a relief groove 20 is formed between the third oil groove 15 and a bearing end face, thereby receiving high temperature oil, allowing it escape to the exterior to prevent the rise in temperature of the oil present in the second oil groove 14 and maintaining the cooling effect for the rotor shaft 5 with the oil present in the second oil groove 14.

Moreover, oil is supplied from the exterior to the third oil groove 15 through the third oil supply hole 18, thereby increasing the pressure of the oil present in the third oil groove 15 and facilitating discharge of the high temperature oil received. The "high temperature oil received" indicates the high temperature oil received by the third oil groove 15 after being supplied between the bearing surface 12 and the rotor shaft 5 from the first oil groove 13 and after subsequent flowing to the lowest portion of the gap between the bearing surface 12 and the rotor shaft 5. Oil is supplied to the third oil groove 15 also from the exterior through the third oil supply hole 18. The high temperature oil received is blocked by the oil supplied from the exterior to the third oil groove 15. Then, the high temperature oil received by the third oil groove 15 is driven away to the relief groove 20 by the oil supplied to the third oil groove 15 and is discharged from the relief groove 20.

Next, a description will be given below about the operation of the radial bearing 7 in the oil-cooled screw compressor 1 constructed as above.

The oil which has been separated and recovered by the oil separating/recovering unit from the gas discharged from the screw compressor 1 is supplied through a oil supply pipe (not shown) to the first, second and third oil supply holes 16, 17, 18 of the radial bearing 7. The oil supplied from the first oil supply hole 16 to the first oil groove 13 gets into the gap between the bearing surface 12 and the rotor shaft 5 and acts as lubricating oil while flowing in the directions of arrows $R_1$ and $R_2$, then flows into the third oil groove 15. The oil supplied from the second oil supply hole 17 to the second oil groove 14 cools the rotor shaft 5, then flows out from the relief groove 20. The oil supplied from the third oil supply hole 18 to the third oil groove 15 flows out from the relief groove 19 together with the high-temperature oil which has entered the third oil groove 15 through the gap between the bearing surface 12 and the rotor shaft 5 and thus the high temperature oil supplied as lubricating oil is discharged.

Since the oil pressure area of the first oil groove 13 for the rotor shaft 5 is small, the load induced by the oil pressure supplied to the first oil groove 13 becomes small and hence it is possible to prevent damage of the bearing 7. Moreover, since the circumferential length S of the second oil groove 14 is larger than that of the first oil groove 13 and thus the cooling area thereof is large, its cooling effect for the rotor shaft 5 is outstanding. Further, since the high temperature oil used for lubrication is discharged through the third oil groove 15 before reaching the second oil groove 14, it is possible to prevent the rise in temperature of the oil present in the second oil groove 14 and hence possible to maintain the cooling effect for the rotor shaft 5 with the oil present in the second oil groove 14.

Figure 4:
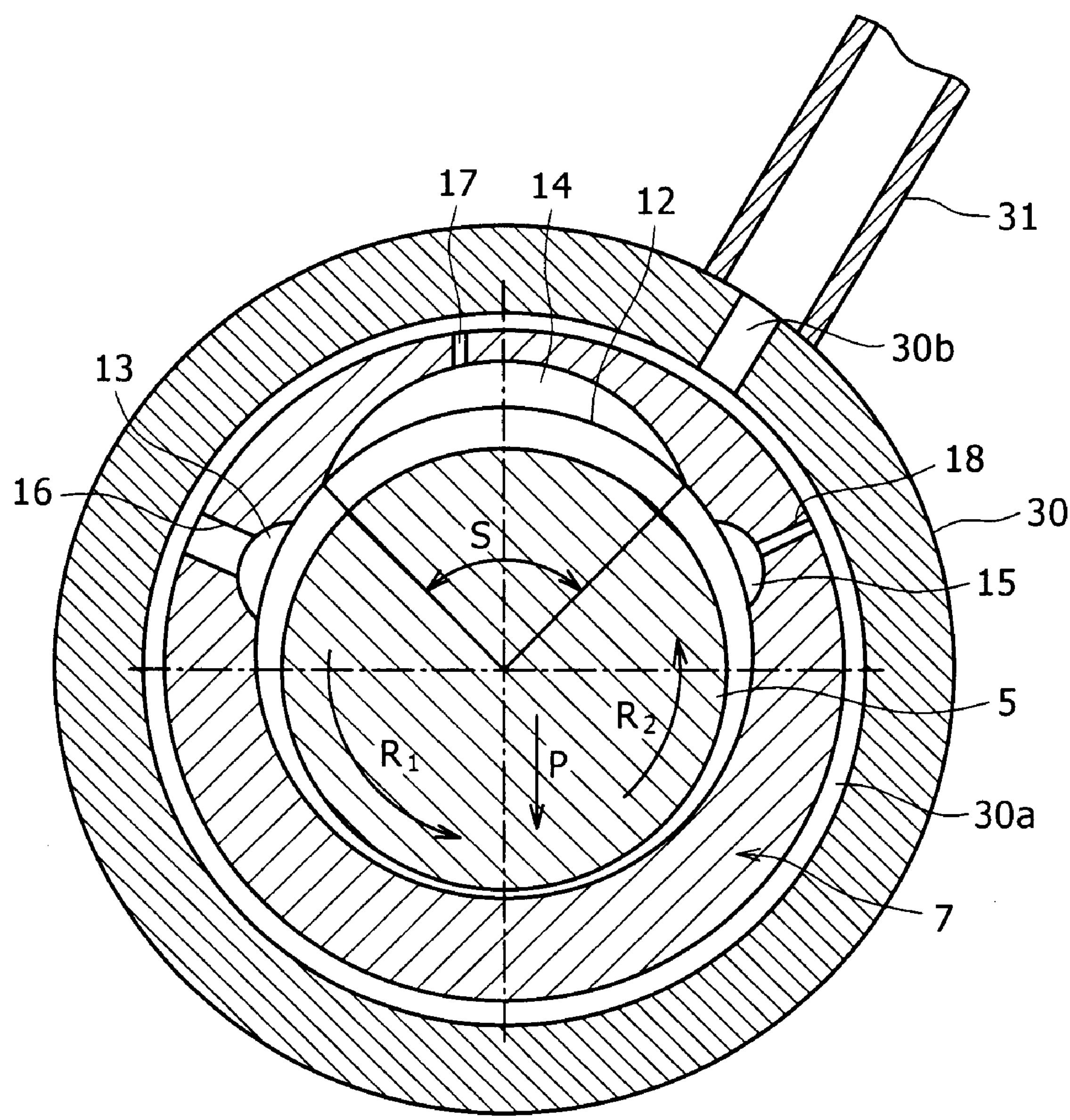
FIG. 4 is a sectional view of a bearing according to another embodiment of the present invention.

FIG. 4 is a sectional view of a bearing according to another embodiment of the present invention. In this embodiment, in addition to the radial bearing 7 described in the embodiment of FIG. 2, there are illustrated a casing member 30 of the screw compressor 1 disposed around the radial bearing 7 and an oil supply path 31 connected to the casing member 30.

The radial bearing 7 is fitted in and fixed to the casing member 30. An annular oil groove 30*a* is formed in an inner periphery portion of the casing member 30 corresponding to the first, second and third oil supply holes 16, 17, 18 of the radial bearing 7 (FIG. 4 is drawn as if the radial bearing 7 were not in contact with the casing member 30 because the annular oil groove 30*a* is depicted, but in the other portion than the portion where the annular oil groove 30*a* is formed the inner periphery wall of the casing member 30 and the outer peripheral wall of the radial bearing 7 are in contact with each other and the radial bearing 7 is fixed to the casing member 30 as noted above). In the casing member 30 is formed a communication hole 30*b* communicating with the annular oil groove 30*a*. The communication hole 30*b* is connected to the oil supply path 31. Oil is supplied from an oil supply source such as, for example, an oil separating/recovering unit (not shown), through the oil supply path 31, communication hole 30*b* and annular oil groove 30*a*, to the first oil supply hole 16, second oil supply hole 17, third oil supply hole 18, further to the first oil groove 13, second oil groove 14 and third oil groove 15. The function and effect of the bearing constructed as above are the same as in the previous embodiment.

Figure 5:
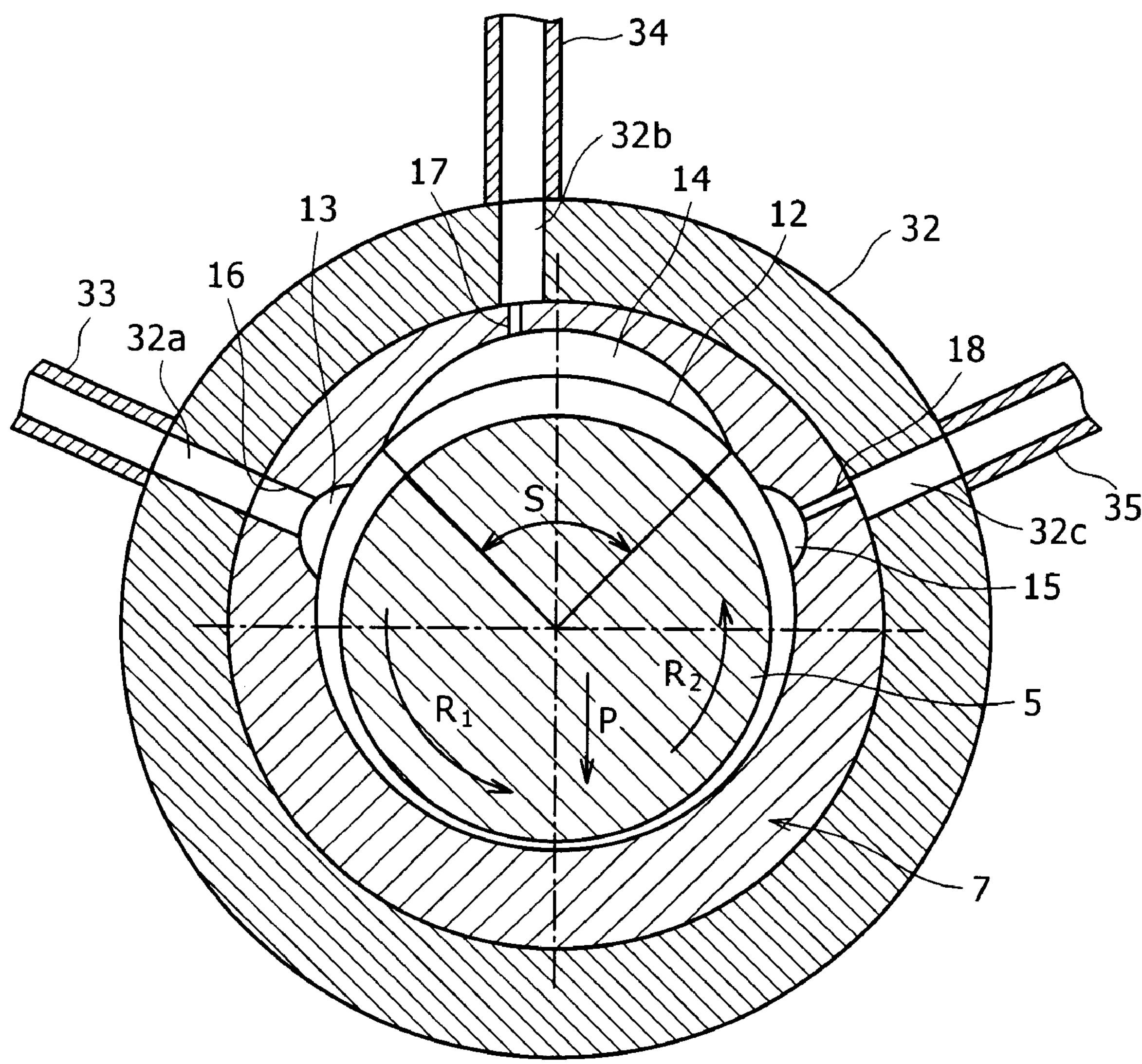
FIG. 5 is a sectional view of a bearing according to a further embodiment of the present invention.

FIG. 5 is a sectional view of a bearing according to a further embodiment of the present invention. In this embodiment, in addition to the radial bearing 7 of the embodiment shown in FIG. 2, there are provided a casing member 32 of the screw compressor 1 disposed around the radial bearing 7 and oil supply paths 33, 34 and 35 connected to the casing member 32. This embodiment is different from the bearing of the embodiment shown in FIG. 4 in the configuration of channels for the supply of oil to the first, second and third oil grooves 13, 14, 15.

More specifically, the casing member 32 is formed with a communication hole 32*a* communicating with the first oil supply hole 16 and having an inside diameter equal to that of the first oil supply hole 16. An oil supply path 33 of the same inside diameter as that of the communication hole 32*a* is connected to the communication hole 32*a*. In the casing 32 there also is formed a communication hole 32*b* communicating with the second oil supply hole 17 and having an inside diameter (equal to that of the communication hole 32*a*) larger than that of the second oil supply hole 17. An oil supply path 34 of the same inside diameter as that of the communication hole 32*b* is connected to the communication hole 32*b*. In the casing member 32 there further is formed a communication hole 32*c* communicating with the third oil supply hole 18 and having an inside diameter (equal to that of the communication holes 32*a* and 32*b*) larger than that of the third oil supply hole 18. An oil supply path 35 of the same inside diameter as that of the communication hole 32*c* is connected to the communication hole 32*c*. That is, the oil supply paths 33, 34 and 35 are of the same inside diameter. The oil supply paths 33, 34 and 35 are branched from a common channel extending from another oil supply source such as, for example, an oil separating/recovering unit (not shown). The function and effect of the bearing thus constructed are the same as in the previous embodiments.

Figure 6:
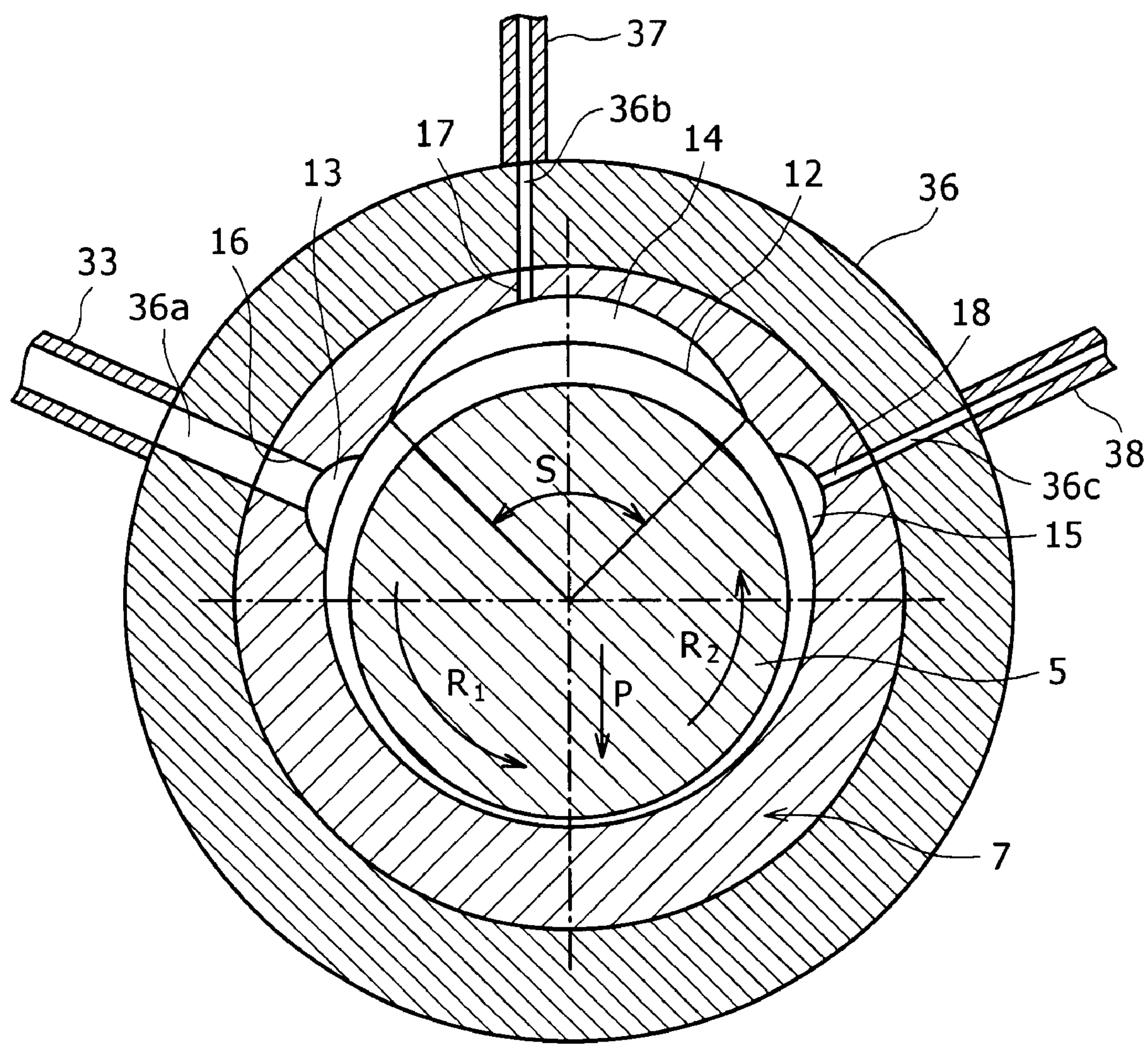
FIG. 6 is a sectional view of a bearing according to a still further embodiment of the present invention.

FIG. 6 is a sectional view of a bearing according to a still further embodiment of the present invention. This embodiment includes a casing member 36 as a substitute for the casing member 32 described in the embodiment of FIG. 5. The casing member 36 is formed with a communication hole 36*a* communicating with the first oil supply hole 16 and having an inside diameter equal to that of the first oil supply hole 16, a communication hole 36*b* communicating with the second oil supply hole 17 and having an inside diameter equal to that of the second oil supply hole 17, and a communication hole 36*c* communicating with the third oil supply hole 18 and having an inside diameter equal to that of the third oil supply hole 18. The communication hole 36*a* and an oil supply path 33 connected thereto are of the same inside diameter, the communication hole 36*b* and an oil supply path 37 connected thereto are of the same inside diameter, and the communication hole 36*c* and an oil supply path 38 connected thereto are of the same inside diameter. The oil supply paths 33, 37 and 38 are branched from a common channel extending from an oil supply source such as, for example, an oil separating/recovering unit (not shown). The function and effect of the bearing thus constructed are the same as in the previous embodiments.

Also in FIGS. 5 and 6 it is important that the sectional area of at least a part of the channel communicating with the second oil groove 14 be smaller than the sectional area of any of the oil channels communicating with the first oil groove 13, that is, a minimum value of the sectional area perpendicular to the longitudinal direction of the oil channel to the second oil groove 14 be smaller than that of the sectional area perpendicular to the longitudinal direction of the oil channel to the first oil groove 13. For example, in the embodiment of FIG. 5, the sectional area of the second oil supply hole 17 is smaller than the sectional area of any of the first oil supply hole 16, communication hole 32*a* and oil supply path 33 communicating with the first oil groove 13. In the embodiment of FIG. 6 the second oil supply hole 17, communication hole 36*b* and oil supply path 37 are smaller in sectional area than any of the first oil supply hole 16, communication hole 36*a* and oil supply path 33 communicating with the first oil groove 13. In any case, the internal pressure of the second oil groove 14 becomes lower than that of the first oil groove 13.

Figure 7:
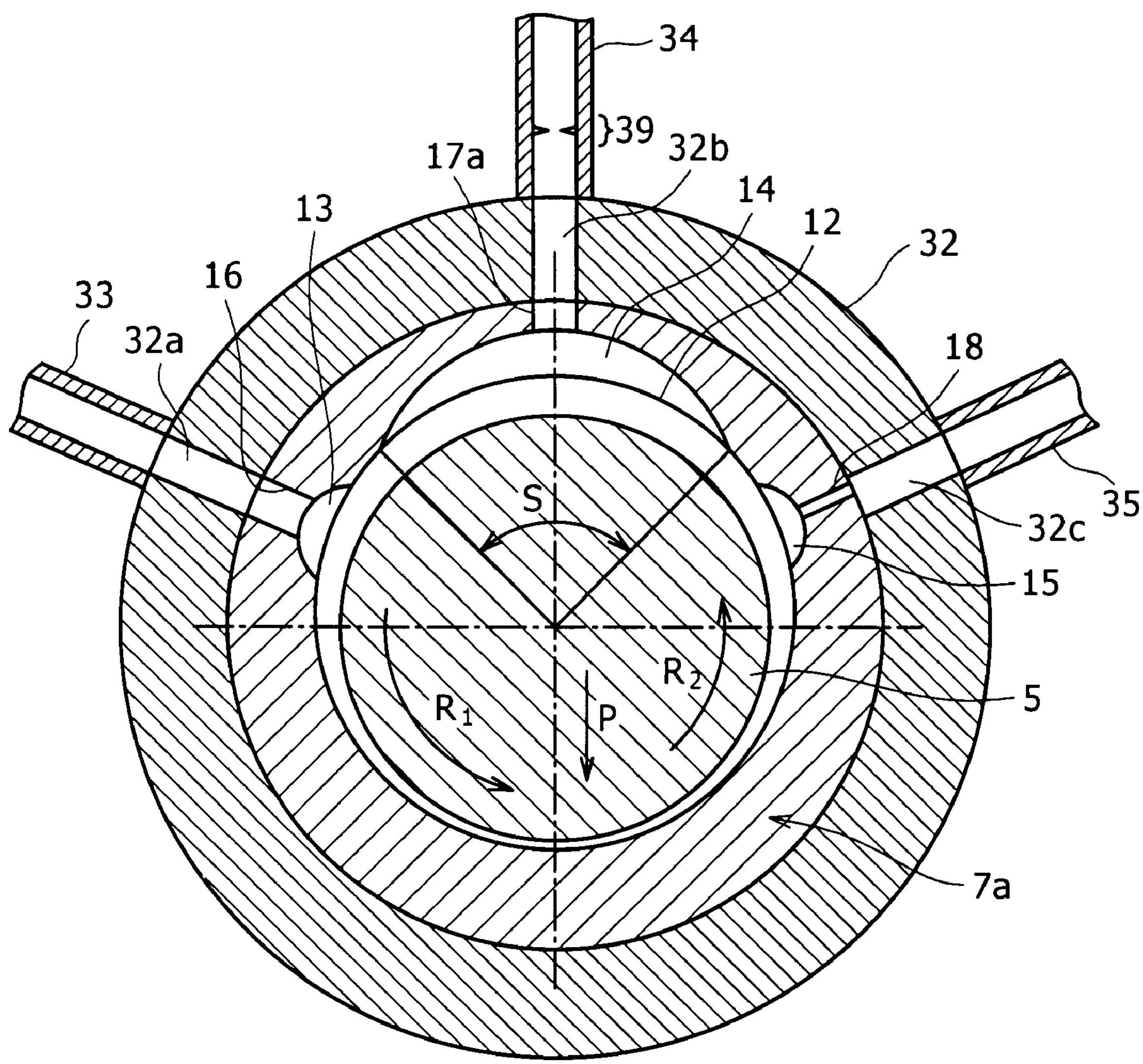
FIG. 7 is a sectional view of a bearing according to a still further embodiment of the present invention.
Figure 8:
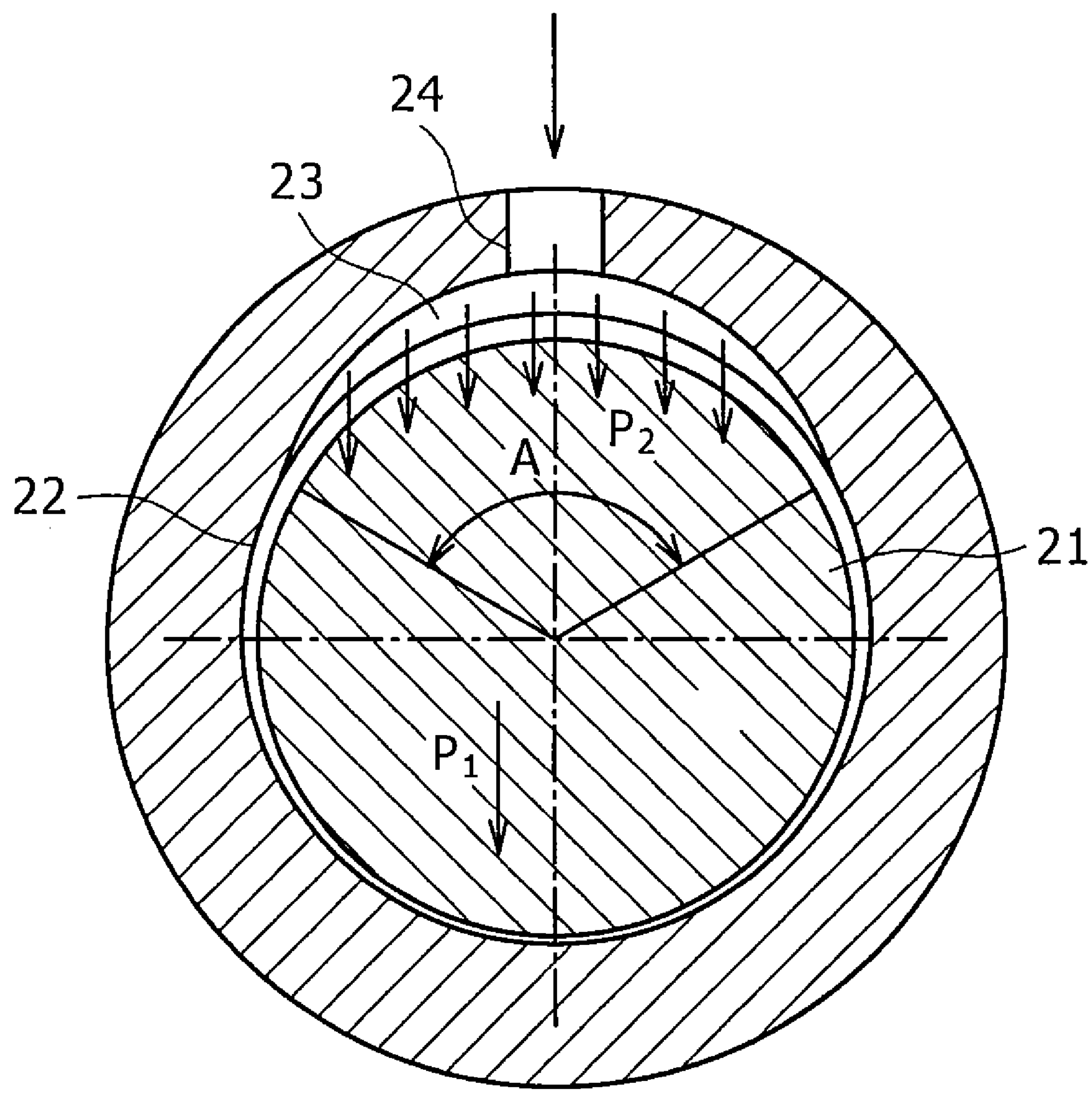
FIG. 8 is a sectional view of a conventional radial bearing.

FIG. 7 is a sectional view of a bearing according to a still further embodiment of the present invention. In this embodiment, the inside diameter of a second oil supply hole 17*a* formed in a radial bearing 7*a* is the same as that of the first oil supply hole 16. Further, an orifice 39 (throttle means) is formed in the oil supply path 34. As noted above, the inside diameter of the second oil supply hole 17*a* is the same as that of the first oil supply hole 16, but since the orifice 39 (throttle means) is provided in the oil supply path 34, the internal pressure of the second oil groove 14 becomes lower than that of the first oil groove 13. The function and effect of the bearing thus constructed are the same as in the previous embodiments. In place of the orifice 39 there may be adopted another throttle means such as, for example, a nozzle, a V cone nozzle, or a venturi tube. Preferably, the throttle means used is of the type in which the degree of throttle can be adjusted appropriately.

In addition, a bearing according to an embodiment of the present invention, may be also applied to other types of compressors such as a rotary compressor and a turbocompressor as well as to above mentioned screw compressor.

What is claimed is:

1. A compressor bearing for supporting a rotor shaft of a compressor, wherein a first oil groove is formed in a bearing surface on the side opposite to a bearing load acting direction and a second oil groove is formed in the bearing surface at a position adjacent to said first oil groove in an anti-rotational direction, a circumferential length of said second oil groove being larger than that of said first oil groove, said bearing comprising:

a first oil channel communicating with said first oil groove to supply oil to the first oil groove from the exterior;

a second oil channel communicating with said second oil groove to supply oil to the second oil groove from the exterior; and a common oil supply source disposed outside said bearing to supply oil to both said first oil channel and said second oil channel, wherein a minimum value of a sectional area perpendicular to the longitudinal direction of said second oil channel is smaller than a minimum value of a sectional area perpendicular to the longitudinal direction of said first oil channel.

2. The compressor bearing according to claim 1, wherein the area of opening of an oil supply hole in a boundary position between said second oil channel and said second oil groove is smaller than that of an oil supply hole in a boundary position between said first oil channel and said first oil groove.

3. The compressor bearing according to claim 1, wherein the sectional area perpendicular to the longitudinal direction of said second oil channel in said bearing is constant and the sectional area perpendicular to the longitudinal direction of said first oil channel in said bearing is also constant.

4. The compressor bearing according to claim 1, wherein throttle means is provided in said second oil channel and the sectional area perpendicular to the longitudinal direction of said second oil channel is the smallest at the position of said throttle means.

5. The compressor bearing according to claim 1, wherein a relief groove extending from said second oil groove to a bearing end face is formed in said bearing surface.

6. The compressor bearing according to claim 1, wherein a third oil groove is formed in the bearing surface on the side opposite to the bearing load acting direction and in adjacency to said second oil groove in the anti-rotational direction and a relief groove extending from said third oil groove to a bearing end face is formed in said bearing surface.

7. The compressor bearing according to claim 6, wherein a third oil channel communicating with said third oil groove to supply oil to the third oil groove from the exterior is provided and oil is supplied to said third oil channel from said common oil supply source.

* * * * *